(No Model.)  
B. HOLMES.  
MOTOR VEHICLE.  
No. 601,440.  
2 Sheets—Sheet 2.  
Patented Mar. 29, 1898.
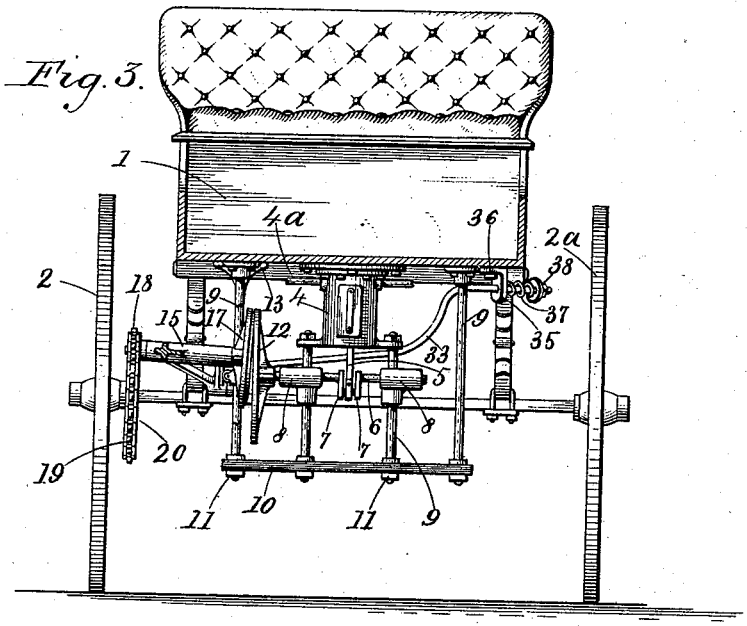
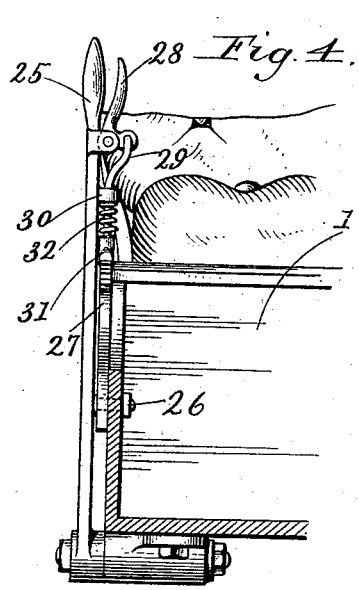
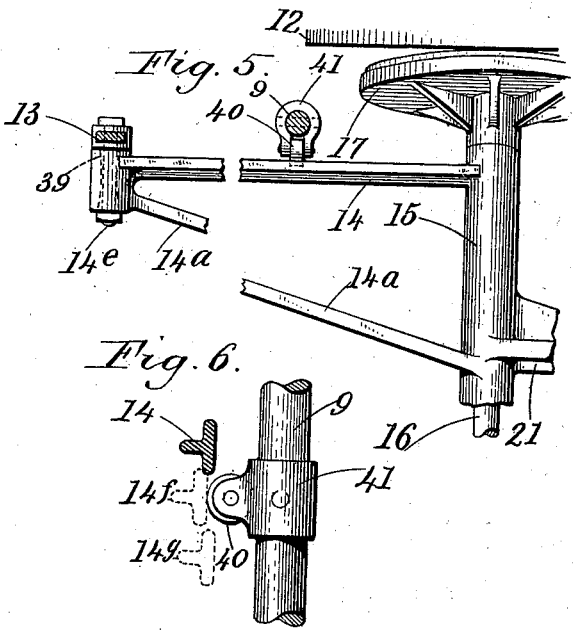
Witnesses,  
Emil Neuhart  
L. M. Spong.
Britain Holmes Inventor.  
By James Sangster Attorney.

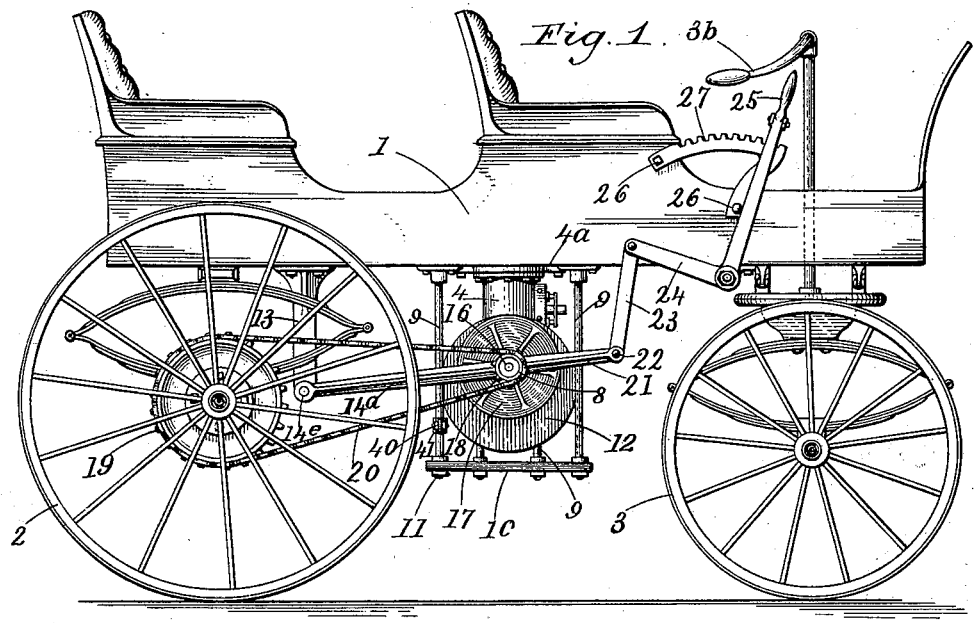

UNITED STATES PATENT OFFICE.

BRITAIN HOLMES, OF BUFFALO, NEW YORK.

MOTOR-VEHICLE.

SPECIFICATION forming part of Letters Patent No. 601,440, dated March 29, 1898.

Application filed November 9, 1895. Serial No. 568,432. (No model.)

*To all whom it may concern:*

Be it known that I, BRITAIN HOLMES, a citizen of the United States, residing at Buffalo, in the county of Erie and State of New York, have invented certain new and useful Improvements in Conveying Vehicles or Vessels, of which the following is a specification.

My invention relates to certain improvements in conveying vehicles or vessels driven by gas, gasolene, or other engines, whereby the wagon or other vehicle may be made to go forward or back or move at any rate of speed, from its maximum speed downward, while going in either direction, or to stop moving entirely at any time without in any way interfering with the speed or continuous operation or action of the engine, all of which will be fully and clearly hereinafter described and claimed, reference being had to the accompanying drawings, in which—

Figure 1 represents a side elevation of a suitable vehicle for illustrating my invention. Fig. 2 represents a top plan view, the body of the vehicle being omitted. Fig. 3 represents a front sectional elevation on or about line $a$ $a$, Fig. 2. Fig. 4 is a front sectional elevation of a portion of the device, showing a similar view of the operating-lever and its several parts. Fig. 5 represents a detached top plan view of a portion of the friction mechanism and its operating parts. Fig. 6 represents a side elevation of a portion of the speed-operating mechanism, for illustrating the action of the device while going in either direction, from a high to a slower speed, or coming to a standstill.

Although my invention is well adapted for a road-wagon or a wheeled vehicle of any kind, it is also as well adapted for governing the action of a propeller on a boat without in any way interfering with the continuous action or operation of its engine. It will reverse the action of the propeller or increase or decrease its speed while going in either direction, or stop its action, while the engine is uninterrupted. Therefore, in describing my invention, where I use the term "motor" I wish it to be understood as indicating the engine, of whatever kind, and the term "propeller" to designate the portion of the machine which causes the conveyance to move forward—as, for instance, the wheel of a vehicle or the propeller proper of a boat.

Referring to the drawings in detail, I have shown an ordinary road-wagon, mounted on the usual springs, as a suitable vehicle for illustrating my invention.

1 designates the body of the vehicle. The rear wheels 2 and $2^a$ and front wheels 3 and $3^a$ are fitted to the axles of the vehicle in the usual way and provided with handles $3^b$ for steering the vehicle. (See Fig. 1.)

I have shown the rear wheels as adapted to run independently, in the ordinary manner, on their axles; but the two wheels may be rigidly secured to the axle, so that both will turn together, or two friction-gears may be used to operate both wheels at the same time. However, either construction is immaterial. I have shown the propelling device connected to one wheel as a suitable means for clearly and fully illustrating my invention and its operation.

It is well known that a gas-engine or gasolene or other similar engine cannot be controlled in its action or started or stopped with the same ease and convenience as a steam-engine. Consequently the office of my improved device is to perform all these operations without interfering with the motion of the engine, the engine being only the driver of the intermediate varying-speed mechanism used to operate the propeller.

In this instance I have shown the engine 4 suspended from a plate $4^a$ at the bottom of the vehicle. It is provided with the usual connecting-rod 5, (see Fig. 3,) crank-shaft 6, and cranks 7.

The crank-shaft is mounted in boxes 8, fastened to a supporting-frame consisting of the vertical bars 9, secured to the plate $4^a$, and the horizontal bars 10, connected to said bars by screw-nuts 11; but this frame may be varied to adapt it to different conditions or locations in the vehicle or vessel to which it may be connected.

On the end of the crank-shaft is rigidly secured a driving friction-disk 12, and to a supporting-hanger 13 is pivoted one end of a movable frame consisting of the parts 14 and $14^a$, the part $14^a$ being a supporting-brace connecting with or forming a part of a box 15, in which is mounted at a slight angle to the crank-shaft 6 a shaft 16, having at its inner end a driven friction-disk 17. At its opposite end is secured a small sprocket-wheel 18.

On the inner side of the hub of wheel 2 is rigidly secured a large sprocket-wheel 19, and a sprocket-chain 20 connects the two sprocket-wheels 18 and 19. To the opposite side is rigidly secured, or formed in one piece with it, an arm 21, connected by a pivotal pin 22 with a connecting-arm 23, having its opposite end pivoted to the end of the short arm 24 of the operating-lever 25.

On the side of the wagon is secured by bolts 26 (see Fig. 1) a curved rack-bar 27, and at the upper part of the operating-lever 25 is pivoted the usual movable angular handle 28, (see Fig. 4,) having at the end of its short arm a bar 29, pivoted thereto and extending down through a bearing 30, and having at its lower end a bolt 31, adapted to fit the teeth in the rack-bar 27. A spring 32 keeps it down in engagement therewith, so that by pressing the handle in toward the handle 25 the bolt will be lifted up out from the teeth of said rack-bar, and thereby allow the lever 25 to be moved back and forth, all of which is well known and easily understood.

To keep the driven friction-disk 17 in contact with sufficient force, a connecting-rod 33 is pivoted by a pin 34 (see Fig. 2) to the frame portion 14, and its opposite end passes loosely through a small angle-plate 35, secured by a bolt 36 to the bottom of the wagon or other suitable support, (see Fig. 3, also Fig. 2,) and is provided with a spiral spring 37, kept up by a nut 38. This construction draws the driven disk in close contact with the driving-disk, and the force of the spring may be regulated by the nut 38 to allow the frame 14 14$^a$ to move laterally on its pivot 14$^c$. (Shown in Figs. 1 and 5.) In Fig. 5 the pivot 14$^c$ is shown to pass through a hole which is made to enlarge from the center each way out, as shown by the dotted lines 39 in said Fig. 5.

From the above-described construction it will be seen that the driven disk 17 may be made to move either way across the face of the driving-disk and thereby vary the speed while moving in either direction.

To avoid any wearing of the parts when the line of contact of the driven disk is central with the driving-disk, I employ a pivoted friction-roller 40, mounted in a suitable pivotal support 41 on one of the vertical frame-bars 9. (See Fig. 1; also, the detached view, Fig. 6.) The arm 14 as it is being moved carries the driven disk across the driving-disk back and forth with it as it does so. Every time the said arm passes the friction-roller 40 it is moved laterally outward by said roller, as shown by the dotted lines 14$^f$ and 14$^g$ in Fig. 6, and thereby draws the driven disk away from the driving-disk whenever its line of contact is directly over the center of the driving friction-disk, thereby allowing the engine to run without exerting any force whatever on the propelling mechanism.

I claim as my invention—

1. The combination, with a conveyance provided with a motor and a propeller, the shaft of the motor being provided with a driving-disk, of a frame movable across the face of the disk and in a line with the axis thereof, a shaft journaled in the frame provided with a driven disk and with means for transmitting motion to the propeller, means for manually moving the disk across the face of the driving-disk and means for automatically moving it in a line with the axis thereof during a portion of the manual movement, substantially as set forth.

2. The combination, with a conveyance provided with a motor and a propeller, the shaft of the motor being provided with a driving-disk, of a frame movable across the face of the disk and in a line with the axis thereof, a shaft journaled in the frame, one end of which is provided with a driven disk and the other end is provided with means for transmitting motion to the propeller, a roller for engaging with the frame and forcing said disks apart, and means for moving the frame across the face of the driving-disk, substantially as set forth.

3. The combination, with a conveyance, of vertical bars secured thereto, a plate secured to the bars, a motor upon the plate, the shaft of which is provided with a driving-disk, a frame movable across the face of the disk, a shaft journaled in the frame one end of which is provided with a driven disk and the other end is provided with a sprocket-wheel, a roller upon one of the bars in the path of the frame, a handle for moving the frame past the roller, and a sprocket-chain, substantially as set forth.

4. The combination, with a conveyance provided with a motor and a propeller, the shaft of the motor being provided with a driving-disk, of a frame movable across the face of the disk, a shaft journaled in the frame, one end of which is provided with a driven disk and the other end is provided with means for transmitting motion to the propeller, means for moving the frame, a rod connected with the frame at one end and having its opposite end passed through a bearing, a spring upon the rod, and a nut for adjusting the tension of the spring, substantially as set forth.

BRITAIN HOLMES.

Witnesses:
JAMES SANGSTER,
L. M. SPONG.